US010640075B2

(12) United States Patent
Chen et al.

(10) Patent No.: US 10,640,075 B2
(45) Date of Patent: May 5, 2020

(54) ROOF MOUNTED SEAT SUPPORT AIRBAG

(71) Applicant: Ford Global Technologies, LLC, Dearborn, MI (US)

(72) Inventors: Huipeng Chen, Canton, MI (US); Zhenyan Gao, Northville, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/950,476

(22) Filed: Apr. 11, 2018

(65) Prior Publication Data

US 2019/0315304 A1    Oct. 17, 2019

(51) Int. Cl.
*B60R 21/232* (2011.01)
*B60R 21/2338* (2011.01)
*B60R 21/214* (2011.01)
*B60R 21/00* (2006.01)

(52) U.S. Cl.
CPC .......... *B60R 21/232* (2013.01); *B60R 21/214* (2013.01); *B60R 21/2338* (2013.01); *B60R 2021/0011* (2013.01); *B60R 2021/23382* (2013.01)

(58) Field of Classification Search
CPC . B60R 21/232; B60R 21/2338; B60R 21/214; B60R 2021/23382; B60R 2021/0011
See application file for complete search history.

(56) References Cited

U.S. PATENT DOCUMENTS

| | | | | |
|---|---|---|---|---|
| 3,918,740 A | * | 11/1975 | Notestine | B60R 21/13 280/756 |
| 4,148,504 A | * | 4/1979 | Rushing | B60R 21/13 182/153 |
| 4,830,402 A | * | 5/1989 | Matthias | B60R 21/13 280/756 |
| 5,853,193 A | * | 12/1998 | Marshall | B60R 21/02 280/748 |
| 5,890,738 A | * | 4/1999 | Heiner | B60R 21/13 267/292 |
| 7,134,683 B2 | * | 11/2006 | Bendig | B60R 21/232 280/730.1 |

(Continued)

FOREIGN PATENT DOCUMENTS

DE    19533375 A1    3/1997
JP    2008018804 A    1/2008

(Continued)

OTHER PUBLICATIONS

Siddarth Raja, "Toyota Introduces Rear-Window Protection Airbag" dated Sep. 30, 2008, retrieved from the Internet URL https://www.motorauthority.com/news (4 pages).

*Primary Examiner* — Darlene P Condra
(74) *Attorney, Agent, or Firm* — Frank A. MacKenzie; Bejin Bieneman PLC

(57) ABSTRACT

An airbag includes an upper portion and a lower portion. The upper portion is for extending from a vehicle roof and engagement with a head rest of a seat in an inflated position. The lower portion forms a cushion board that extends downwardly from the upper portion for engagement with and disposition between a seatback and a restraining bar located rearward of the seatback in the inflated position.

10 Claims, 5 Drawing Sheets

(56) References Cited

U.S. PATENT DOCUMENTS

| | | | | |
|---|---|---|---|---|
| 7,909,357 B2* | 3/2011 | Iida | ............... | B60R 21/213 |
| | | | | 280/730.1 |
| 8,002,309 B2* | 8/2011 | Kim | ............... | B60R 21/214 |
| | | | | 280/729 |
| 8,393,642 B2 | 3/2013 | Nakaya et al. | | |
| 8,403,358 B2* | 3/2013 | Choi | ............... | B60R 21/214 |
| | | | | 280/728.2 |
| 8,419,051 B2* | 4/2013 | Kobayashi | ............... | B60R 21/20 |
| | | | | 280/730.1 |
| 8,573,634 B2* | 11/2013 | Choi | ............... | B60R 21/214 |
| | | | | 280/730.1 |
| 8,851,509 B1* | 10/2014 | Choi | ............... | B60R 21/217 |
| | | | | 280/730.1 |
| 2002/0101067 A1* | 8/2002 | Breed | ............... | B60N 2/0232 |
| | | | | 280/741 |
| 2004/0239084 A1* | 12/2004 | Mori | ............... | B60R 21/214 |
| | | | | 280/730.1 |
| 2006/0055153 A1 | 3/2006 | Hirata | | |
| 2015/0115579 A1* | 4/2015 | Abramoski | ............... | B60R 21/231 |
| | | | | 280/730.1 |
| 2018/0079366 A1* | 3/2018 | Lundberg | ............... | B60R 7/14 |

FOREIGN PATENT DOCUMENTS

| | | |
|---|---|---|
| JP | 4099849 B2 | 6/2008 |
| JP | 2008189023 A | 8/2008 |
| JP | 4645550 B2 | 3/2011 |
| JP | 5062000 B2 | 10/2012 |

* cited by examiner

ROOF MOUNTED SEAT SUPPORT AIRBAG

BACKGROUND

It may be desirable to provide an airbag configuration suited for providing supplemental protection to passengers in certain seating locations when they are subjected to certain type of rear impacts.

DETAILED DESCRIPTION

Figure 1:
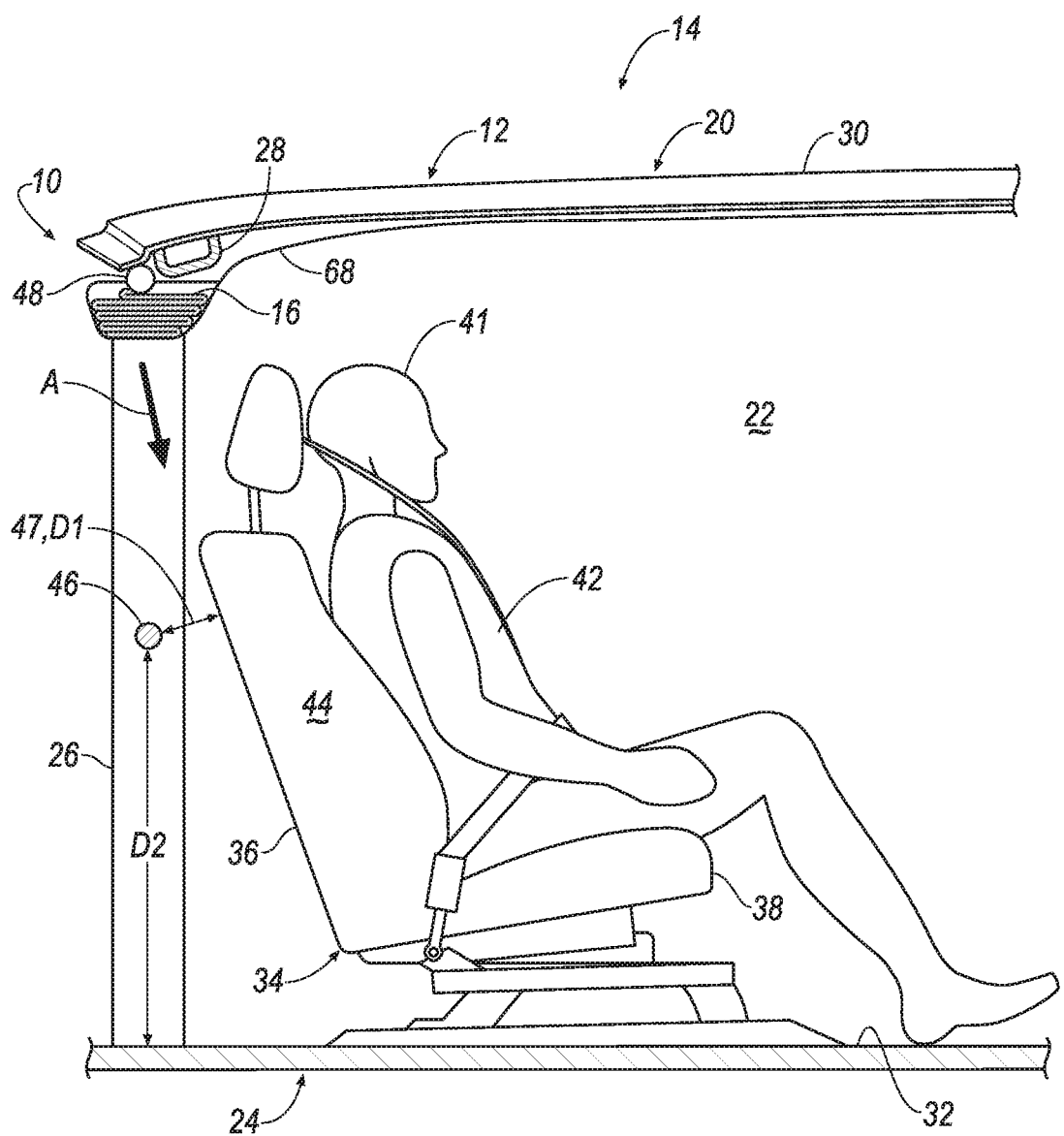
FIG. 1 is a side view of an occupied rear seat of a vehicle of an example vehicle with an example airbag in an undeployed position.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat. In the Figures, like numerals indicate like parts throughout the several views.

An airbag includes an upper portion and a lower portion. The upper portion is for extending from a vehicle roof and engagement with a head rest of a seat in an inflated position. The lower portion forms a cushion board that extends downwardly from the upper portion for engagement with and disposition between a seatback and a restraining bar located rearward of the seatback in an inflated position.

An airbag system includes a restraining bar, an airbag and an inflator. The restraining bar is fixed to a vehicle body rearward of a seatback in an installed position. The airbag includes an upper portion and a lower portion. The upper portion is for extending from a vehicle roof, and for engagement with a head rest of a seat in an inflated position. The lower portion forms a cushion board extending downwardly from the upper portion for disposition between and engagement with the seatback and a restraining bar in the inflated position. The inflator is connected to the upper portion.

A vehicle includes a vehicle body, a seat and an airbag system. The vehicle body includes a roof and a floor. The seat is fixed to the floor and includes a seatback. The airbag system includes a restraining bar, an inflator and an airbag. The restraining bar is substantially horizontal and is fixed to the vehicle body a predetermined distance rearward of the seatback. The inflator is disposed at the roof. The airbag is connected to the inflator and, in an inflated position, extends downwardly from the roof for disposition between the seatback and the restraining bar.

The vehicle may further include a head rest and an airbag. The head rest is on the seatback. The airbag may include an upper portion and a lower portion. The upper portion may extend from a vehicle roof and for engagement with a head rest of a seat in an inflated position. The lower portion may form a cushion board extending from the upper portion and located below the upper portion for disposition between and engagement with a seatback and the restraining bar.

The upper portion of the airbag may have a thickness in a fore-aft direction that is greater than a thickness of the lower portion in the fore-aft direction.

The lower portion of the airbag may include a plurality of substantially evenly spaced and parallel seams and a lateral spacing thereof that in the inflated position defines a plurality of ribs extending from the upper portion to a bottom of the lower portion and defines a thickness of the lower portion that is less than a thickness of the upper portion.

The upper portion may include a plurality of tethers therein extending in a substantially fore-aft direction defining a thickness of the upper portion in an inflated position with the thickness of the upper portion being greater than a thickness of the lower portion.

In an inflated position, the airbag may be substantially equal to a width of a passenger seat.

The upper portion may include a plurality of tethers therein extending in a substantially fore-aft direction that in an inflated position define a thickness of the upper portion. The lower portion may include a plurality of substantially evenly spaced and parallel seams and a lateral spacing thereof that in the inflated position define a plurality of ribs extending from the upper portion to a bottom of the lower portion, and define a thickness of the lower portion that is less than the thickness of the upper portion.

An inflator may be connected to the upper portion.

An example roof-mounted airbag system 10, as illustrated in FIGS. 1-5, may be incorporated into a roof 12 of a vehicle 14. The airbag system 10 may include an example airbag 16.

The vehicle 14 may be operable in a non-autonomous, a semiautonomous mode, i.e., a partly autonomous mode of operation requiring some, i.e., occasional, human driver intervention, or a fully autonomous mode, i.e., a fully autonomous mode requiring no human driver intervention. For purposes of this disclosure, an autonomous mode is defined as one in which each of vehicle 14 propulsion (e.g., via a powertrain including an electric motor and/or an internal combustion engine), braking, and steering are controlled by an autonomous vehicle controller, i.e., a computing device (or devices); in a semi-autonomous mode the controller controls one or two of vehicle 14 propulsion, braking, and steering.

Figure 2:
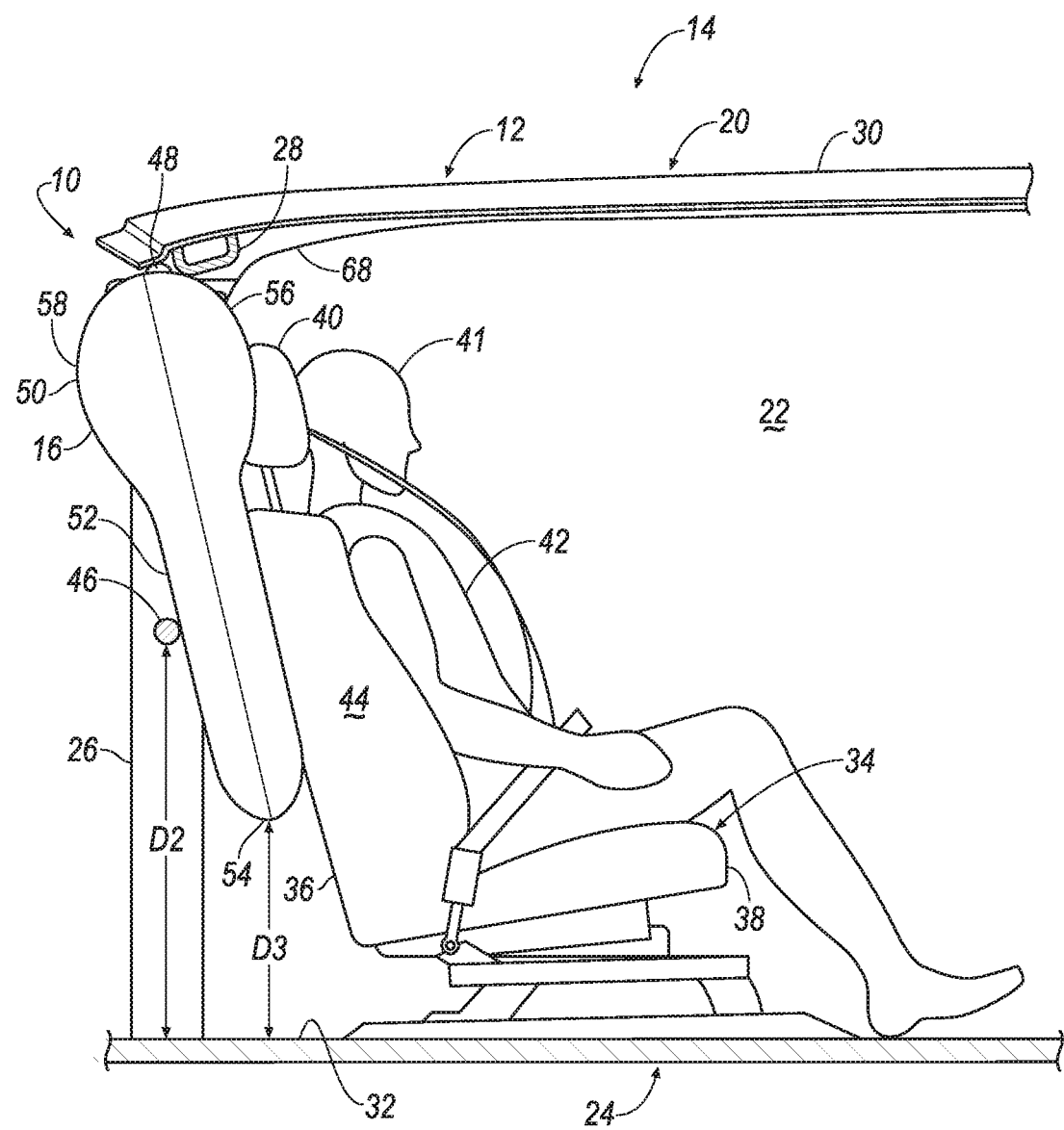
FIG. 2 is a side view of the seat of FIG. 1 with the example airbag in an inflated position.
Figure 3:
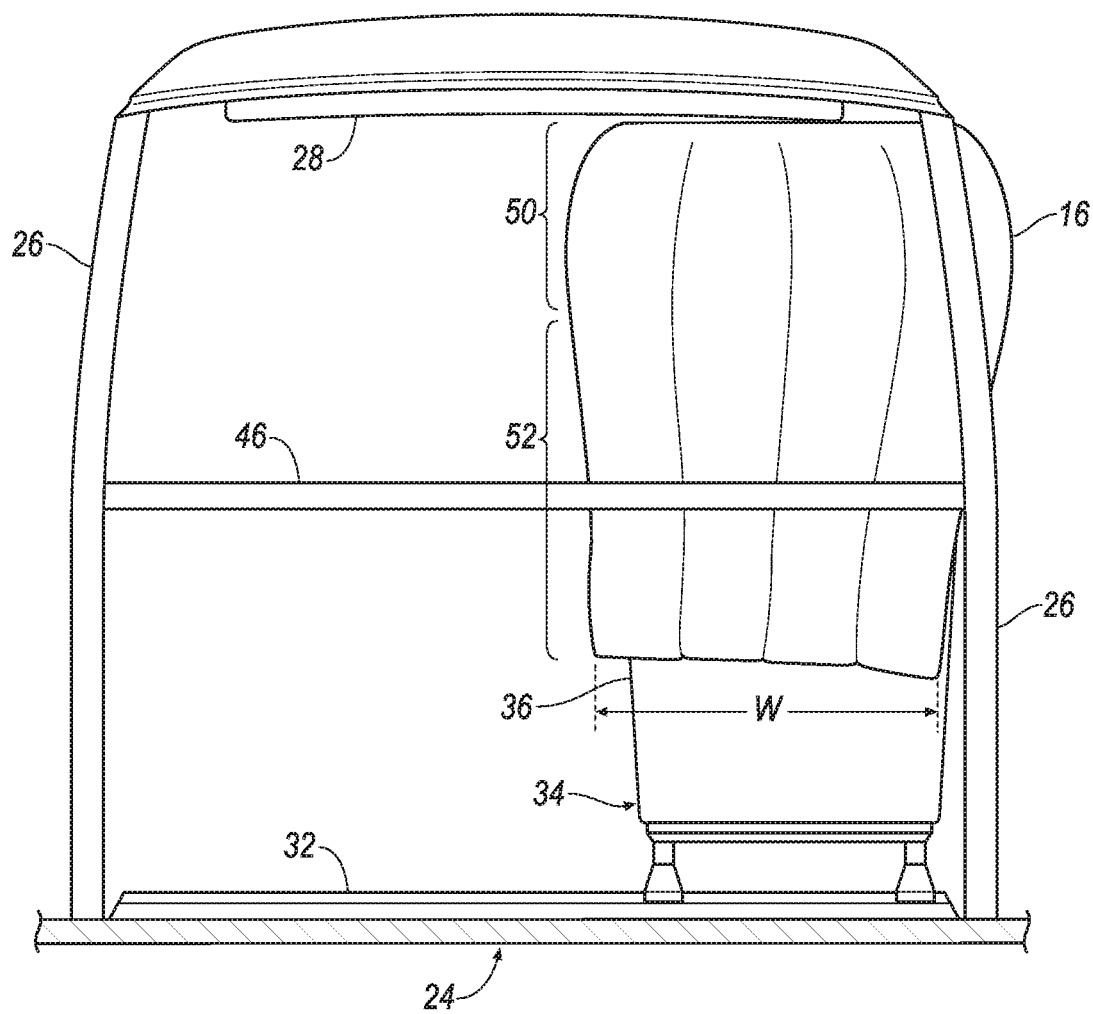
FIG. 3 is a rear view of the seat of FIG. 1 with the example airbag in an inflated position.

As shown in FIGS. 1 through 3, the vehicle 14 includes a vehicle body 20 defining a vehicle interior 22. The vehicle body 20 may include the roof 12, a floor 24, and a plurality of pillars 26 connecting the roof 12 and the floor 24. The vehicle body 20 may have a uni-body construction, a body-on-frame construction, or any other suitable construction.

With reference to FIGS. 1 and 3, the roof 12 may include a longitudinally oriented left roof rail (not shown) and a longitudinally oriented right roof rail (not shown), both oriented substantially parallel to a longitudinal vehicle axis. The roof 12 may further include cross members, e.g., rear cross member 28, transverse to the roof rails and connecting the roof rails, and a roof panel 30 supported on the cross members 28 and the roof rails. The roof 12 may support the airbag 16. For example, the airbag 16 may be connected to the rear cross member 28 of the roof 12 as shown in FIGS. 1 and 2. The airbag 16 may be inflatable away from the roof 12, e.g., in a downward vertical direction, as in the direction of arrow A of FIG. 1, to an inflated, i.e., deployed, position illustrated in FIG. 1.

The floor 24 may include a plurality of cross-beams (not shown) and a floor panel 32 supported on the cross-beams.

The floor 24 may include upholstery, e.g. carpeting, trim, etc., supported on the floor panel 32.

The vehicle 14 may include one or more seats 34 disposed within the vehicle interior 22. The seat 34 shown in FIGS. 1-3 is a bucket seat, but alternatively the seat 34 may be a bench seat or another type of seat. Each seat 34 may include a seatback 36, a seat bottom 38, and a head rest 40. The head rest 40 may be supported by the seatback 36 and may be adjustable in height in height relative to the seatback 36 or integral with the seatback and not adjustable. The seatback 36 may be supported by the seat bottom 38 and may be stationary or movable relative to the seat bottom 38. The seatback 36, the seat bottom 38, and/or the head rest 40 may be adjustable in multiple degrees of freedom. More specifically, the seatback 36, the seat bottom 38, and the head rest 40 may themselves be adjustable in at least one degree of freedom. For example, the seatback 36 may pivot relative to the seat bottom, the seat bottom 38 may slide forwards and backwards in a longitudinal direction relative to the floor or rotate from a forward-facing direction to a rearward-facing direction, and the head rest 40 be vertically adjustable relative to the seatback 36 to better support a head 41 of an occupant 42. The seat bottom 38 be supported by and connected to the floor 24.

Such adjustment may be achieved by employing adjustment mechanisms (not shown) that allow selective position adjustment and fix the seat 34 and its constituent elements 36, 38, 40 in a stationary position relative to the floor during vehicle operation. The adjustment mechanisms allow the seat 34 to be fixed to the floor 24 when the seat is not being actively positioned.

The seat bottom 38 and the seatback 36 may include a frame (not shown) and a covering 44 supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The covering 44 may include upholstery and padding. The upholstery may be formed of cloth, leather, faux leather, or any other suitable material. The upholstery may be stitched in panels around the frame. The padding may be between the covering and the frame, and may be foam or any other suitable material. The covering 44 disposed on a back side of the seatback 36, opposite the occupant 42, may be rigid, e.g., a plastic shell.

During autonomous operation of the vehicle 14, occupants 42 of the vehicle 14 may rotate their seats 34 to face one another. Alternatively, when the vehicle 14 is capable of autonomous operation, it may have its seats 34 permanently oriented to face each other. The example airbag 16, when in the inflated position, i.e., when inflated, may restrain and reduce movement of the head rest and the seatback in a rearward direction when a vehicle is struck from a direction to the rear of the occupant 42. The airbag 16 may thus also restrain movement of the occupants 42 in a rearward direction.

A substantially horizontal restraining bar 46, illustrated in FIGS. 1-3 in an installed position, is fixed to the vehicle body 20 an example predetermined distance D1, rearward of the seatback, defining a gap 47, and an example distance D2, above the floor panel 32. The airbag system 10 may be connected to the roof 12. The system's 10 airbag 16, and an inflator 48, as elements of the system 10, may likewise be disposed at the roof 12. In an inflated position, the airbag 16 extends downwardly from the roof 12 for disposition between the seatback 36 and the restraining bar 46.

The airbag 16 includes an upper portion 50 and a lower portion 52. The inflator 48 is connected to the upper portion 50 of the airbag. The upper portion 50 is connected to and extends downwardly from the vehicle roof 12 in the direction of arrow A. The upper portion 50 engages with the head rest 40 of the seat 34 in an inflated position. The lower portion 52 defines a cushion board that extends downwardly from and below the upper portion 50 in its inflated position. The lower portion 52 is disposed between and engages both the seatback 36 and the restraining bar 46. The lower portion 52 may have a lower end, i.e., a bottom 54, which, in the inflated position, is at a distance D3, above the floor 24. Distance D2 is greater than distance D3.

The airbag 16, including the upper portion 50 and the lower portion 52, may be defined by a front panel 56 and an opposed rear panel 58. The front panel 56 may be disposed towards the seatback 36 in the inflated position. The opposed rear panel 58 may be disposed towards the restraining bar 46 in the inflated position. The panels 56 and 58 cooperatively define a single chamber 60 within the airbag 16, joining the upper portion 50 and the lower portion 52.

With the airbag 16 in its inflated position, the upper portion 50 may be thicker in a fore-aft direction than the lower portion 52.

The lower portion 52 may include a plurality of substantially evenly spaced and parallel rib seams 62 and a lateral spacing thereof that in the inflated position define a plurality of ribs 64 extending from the upper portion 50 to the bottom 54 of the lower portion 52 and defining a thickness T1, of the lower portion 52 that may be less than a thickness T2, of the upper portion 50. An example quantity of rib seams 62 may be three, defining four ribs 64. The rib seams 62, by their lateral proximity to each other and to outboard edges of the lower portion 52, define the thickness T1 of the lower portion 52 and thus the cushion board. The rib seams 62 do not need to provide an airtight seal between the ribs 64. The rib seams 62 may be defined by stitching that also connects a front panel 56 and a rear panel 58. The rib seams 62 may alternatively be formed by providing a panel (not shown) between the front panel 56 and the rear panel 58. Each rib seam 62 may yet alternatively be formed by a plurality of tethers disposed between the front panel 56 and the rear panel 58. The ribs 64 may define a thickness T1 of the lower portion 52.

The upper portion 50 includes a plurality of tethers 66 therein extending in a substantially fore-aft direction defining the thickness T2 of the upper portion 50 in the inflated position. The tethers 66 may connect the front panel 56 and the rear panel 58. An example quantity of tethers 66 is six, with two tethers 66 disposed one above the other, mid-way between lateral sides of the upper portion 50, and two tethers 66 to a left of the center tethers 66, and two tethers 66 to a right of the center tethers 66, midway between the center tethers 66 and the respective lateral sides. If the tethers 66 are laterally aligned with the seams 62, it may give the airbag 16 the appearance of having the ribs 64 extend into the upper portion 50.

The airbag 16, when in an inflated position, may be substantially equal to a width W of the passenger seat 34.

The airbag 16 may be formed of a woven polymer or any other material. As one example, the airbag 16 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The tethers 66 may be formed of the same material as the airbag 16 and may be sewn into the airbag 16.

The inflator 48, as noted above, may be connected to the airbag 16. The inflator 48 expands the chamber 60 with an inflation medium, such as a gas. The inflator 48 may be, for example, a pyrotechnic inflator that uses a chemical reaction to drive the inflation medium into the chamber 60. Alternatively, the inflator 48 may be, for example, a cold-gas inflator which, when activated, ignites a pyrotechnic charge that creates an opening for releasing the pressurized inflation medium, e.g., helium, argon, directly into the chamber 60, or, alternatively via a fill tube (not shown) between the inflator 48 and the chamber 60. Alternatively, the inflator 48 may be of any suitable type, for example, a hybrid inflator.

Figure 4:
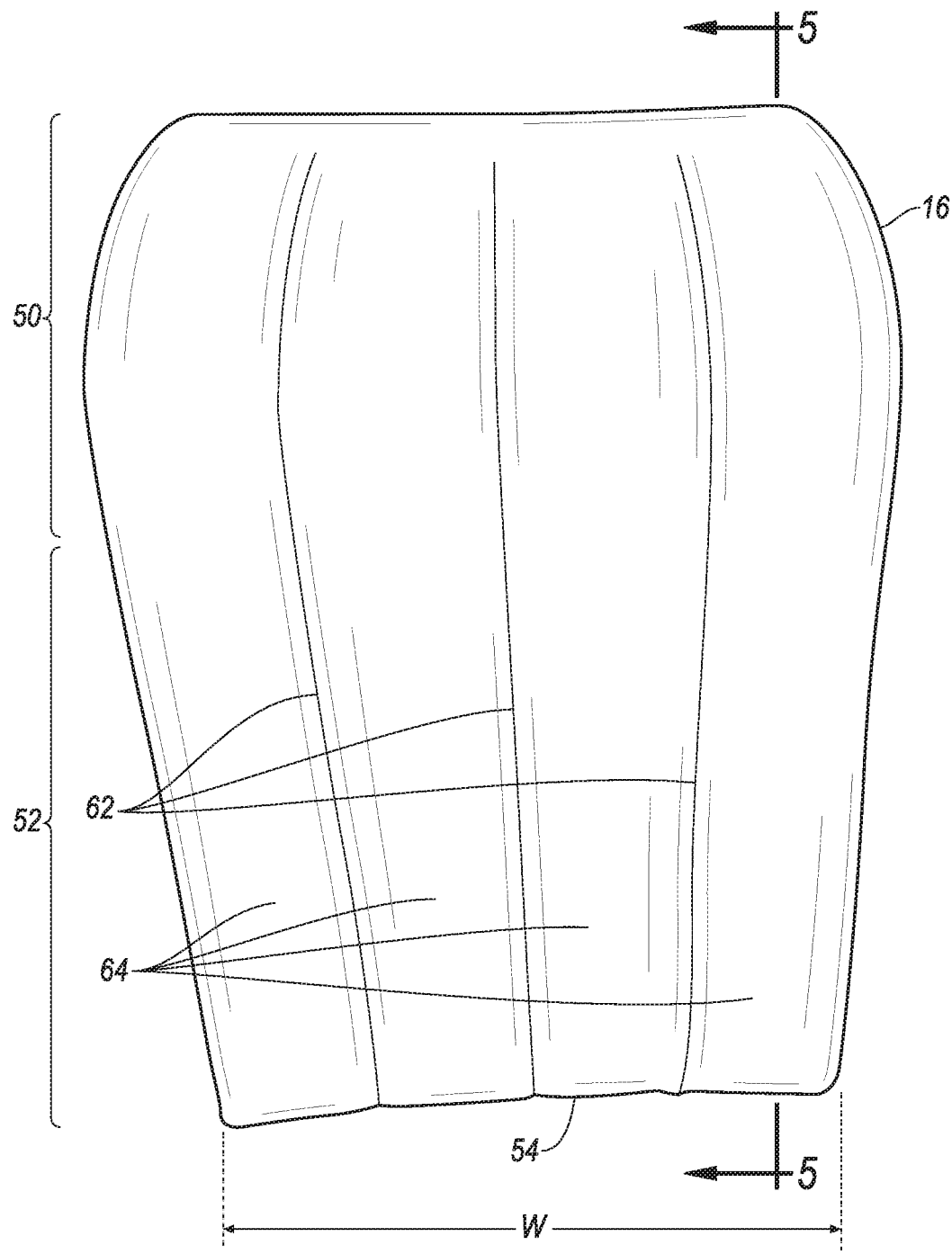
FIG. 4 is a rear view of the airbag of FIGS. 1-3 with the example airbag in the inflated position.
Figure 5:
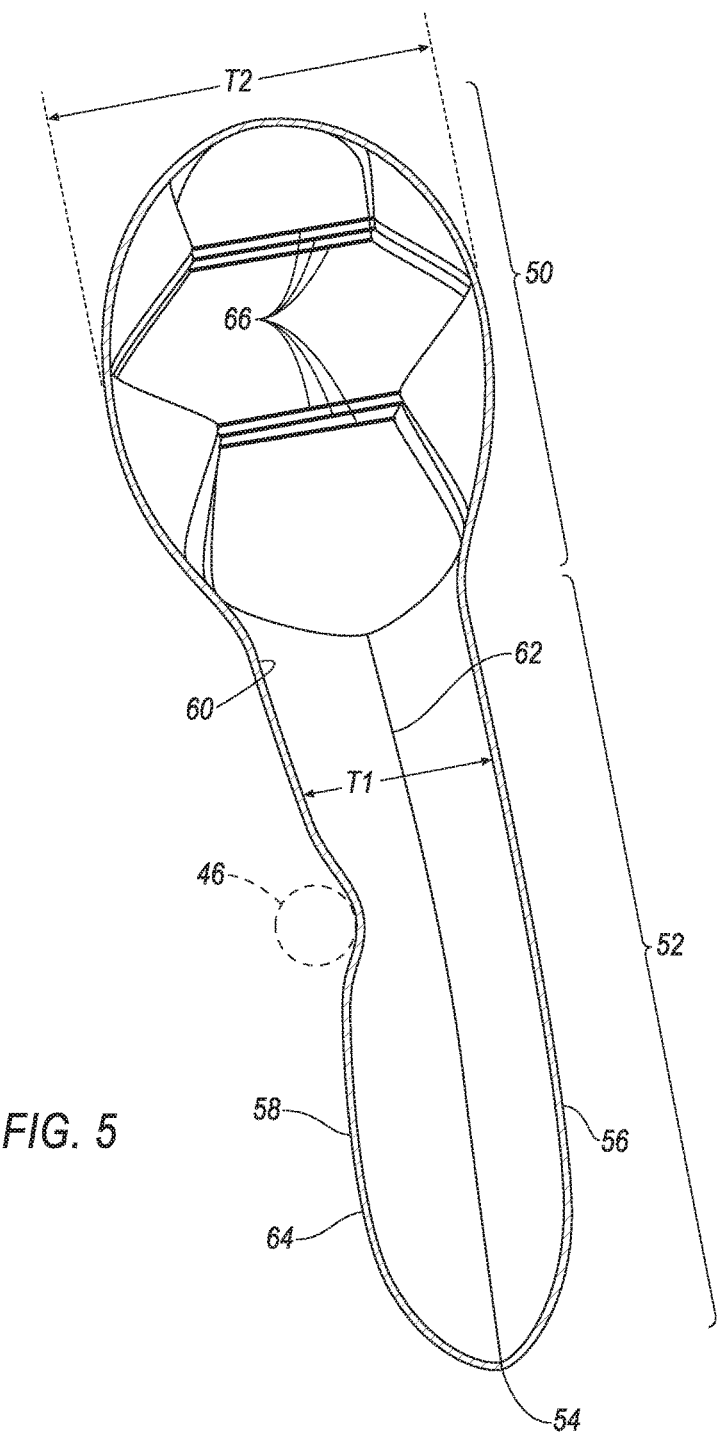
FIG. 5 is a section side view of the airbag of FIGS. 1-4 in the direction of arrows 5.

The inflator 48 may be supported by or react against any of the roof rails or cross members 28, for example, as shown in FIG. 4. Alternatively, the inflator 48 may be supported by the pillars 26 or roof rails. Yet alternatively, the inflator 48 may be disposed inside the airbag 16. For exemplary purposes, the inflator 48 is mounted outside the airbag 16, at the upper portion 50 of the airbag 16, as shown in FIG. 4. The airbag 16 may be configured to mount the inflator 48 to the upper portion 50 of the airbag 16, and the airbag 16 may alternatively be configured to have the inflator 48 spaced from the airbag 16.

When the inflator 48 is not disposed inside the airbag 16, one or more fill tubes (not shown) may be incorporated into the system 10, extending from ports (not shown) provided by the inflator 48 to the connection points (not shown) connecting with the chamber 60 of the airbag 16. The ports may communicate with the chamber 60 through the fill tubes connected to the connection points. The fill tube or tubes may be formed of any suitable high strength flexible material, e.g., nitrile rubber, nylon, thermoplastic elastomer (TPE), etc.

With reference to FIG. 1, in the uninflated position, the airbag 16 may be folded in a compact space between the roof panel 30 and a headliner 68. For example, in the uninflated position, the airbag 16 may extend laterally parallel to the cross member 28 at each seating position.

The headliner 68 may define a tear seam (not shown) substantially aligned with, i.e., in substantial alignment with, the airbag 16. The tear seam may extend an entire width of the airbag 16. Upon inflation of the airbag 16, the airbag 16 may break the headliner 68 at the tear seam and protrude outwardly from the headliner 68 to the inflated position. Additionally, the airbag 16 may be covered by a cover (not shown) disposed between the roof panel 30 and the headliner 68. The cover may protect the airbag 16 in the uninflated position from wear and tear.

As set forth further below, the airbag 16 may inflate from an uninflated position, as shown in FIG. 1, to the inflated position, as shown in FIGS. 2-5. This inflation may occur in response to a vehicle impact. The airbag 16 in the inflated position may absorb energy during the vehicle impact from the occupant 42, and thereby the airbag 16 in the inflated position may reduce an amount of rearward deflection of the seatback 36 and the head rest 40 and associatively reduce both a risk of injury to the occupant and a severity of any injury to the occupant 42. The airbag 16 may restrain rearward movement of the seatback 36 and head rest and occupant 42 when the vehicle 14 is impacted to the rear of the occupant 42 and the seat 34.

The example airbag system 10 may operate as follows. Sensors (not shown), responsive to a vehicle impact from the rear, whether direct or off-set, may provide an impact data signal to the vehicle controller. The vehicle controller may, responsive to the impact data signal, may provide an actuation signal to the inflator 48. Responsive to the actuation signal, the inflator 48 releases a gas into the chamber 60. As the quantity of gas released into the chamber 60 increases, a pressure inside the airbag 16 increases, expanding the airbag 16. With the expansion of airbag 16, the airbag reacts against the roof 12 and the headliner 68. When a predetermined airbag force is reached in the space between the roof 12 and the headliner 68, the tear seam of the headliner 68 may rupture, i.e., open, allowing the airbag 16 to expand beyond the headliner and into the vehicle interior 22. The orientation of the airbag 16 allows it to enter the gap 47 between the restraining bar 46 and the seatback 36.

With the upper portion 50 restrained by its connection to the roof 12 and the engagement of the lower panel with the restraining bar, rearward movement of the seatback 36 and head rest 40 are greatly restrained by the airbag 16. The upper portion 50 may also restrain rearward movement of the occupant's 44 head should the head 41 move off the head rest 40 as might occur when the impact is at an angle, as may occur with an oblique impact. Computer modeling of the airbag system shows that an occupant whole body injury index calculated for an occupant may be improved from a rating of 3.49 without the airbag system 10 to 1.10 with the airbag system 10 in the event of a direct rear impact, and from 2.70 without the airbag system 10 to 1.07 with the airbag system 10 in the event of an oblique rear impact.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising:
    an upper portion for extending from a vehicle roof and for engagement with a head rest of a seat in an inflated position; and
    a lower portion forming a cushion board extending downwardly from the upper portion for engagement with and disposition between a seatback and a restraining bar located rearward of the seatback in the inflated position;
    wherein the upper portion includes a plurality of tethers therein extending in a substantially fore-aft direction that in the inflated position define a thickness of the upper portion and the lower portion includes a plurality of substantially evenly spaced and parallel seams and a lateral spacing thereof that in the inflated position define a plurality of ribs extending from the upper portion to a bottom of the lower portion and define a thickness of the lower portion that is less than the thickness of the upper portion.

2. The airbag of claim 1, wherein the airbag in the inflated position is substantially equal to a width of a passenger seat.

3. The airbag of claim 1, including an inflator connected to the upper portion.

4. An airbag system, comprising:
a restraining bar for being fixed to a vehicle body rearward of a seatback in an installed position;
an airbag including:
   an upper portion for extending from a vehicle roof and for engagement with a head rest of a seat in an inflated position, and
   a lower portion forming a cushion board that in the inflated position extends downwardly from the upper portion for disposition between and engagement with the seatback and the restraining bar; and
an inflator connected to the upper portion;
wherein the upper portion includes a plurality of tethers therein extending in a substantially fore-aft direction that in the inflated position define a thickness of the upper portion and the lower portion includes a plurality of substantially evenly spaced and parallel seams and a lateral spacing thereof that in the inflated position define a plurality of ribs extending from the upper portion to a bottom of the lower portion and define a thickness of the lower portion that is less than the thickness of the upper portion.

5. The airbag system of claim 4, wherein the airbag in the inflated position is substantially equal to a width of a passenger seat.

6. A vehicle comprising:
a vehicle body including a roof and a floor;
a seat fixed to the floor and the seat including a seatback;
a head rest on the seatback; and
an airbag system connected to the roof and including:
   a substantially horizontal restraining bar fixed to the vehicle body rearward of the seatback and lower than the head rest;
   an inflator disposed at the roof;
   an airbag connected to the inflator that in an inflated position extends downwardly from the roof between the seatback and the restraining bar;
   the airbag including an upper portion that in the inflated position extends from the roof and abuts the head rest; and
   the airbag including a lower portion that in the inflated position extends downwardly from the upper portion and abuts both the seatback and the restraining bar;
   the upper portion having a thickness in a fore-aft direction that is greater than a thickness of the lower portion in the fore-aft direction.

7. The vehicle of claim 6, wherein the airbag in the inflated position is substantially equal to a width of a passenger seat.

8. The vehicle of claim 6, wherein the lower portion includes a plurality of substantially evenly spaced and parallel seams and a lateral spacing thereof that in the inflated position define a plurality of ribs extending from the upper portion to a bottom of the lower portion and define the thickness of the lower portion that is less than the thickness of the upper portion.

9. The vehicle of claim 6 wherein the upper portion includes a plurality of tethers therein extending in a substantially fore-aft direction defining the thickness of the upper portion in the inflated position greater than the thickness of the lower portion.

10. The vehicle of claim 6, wherein the upper portion includes a plurality of tethers therein extending in a substantially fore-aft direction that in the inflated position define the thickness of the upper portion and the lower portion includes a plurality of parallel seams and a lateral spacing thereof that in the inflated position define a plurality of ribs extending from the upper portion to a bottom of the lower portion and define the thickness of the lower portion that is less than the thickness of the upper portion.

* * * * *